(12) United States Patent
Massimino

(10) Patent No.: US 8,326,061 B2
(45) Date of Patent: Dec. 4, 2012

(54) FAST VISUAL DEGRADING OF IMAGES

(75) Inventor: Pascal Massimino, Orsay (FR)

(73) Assignee: Google Inc., Mountain View, CA (US)

( * ) Notice: Subject to any disclaimer, the term of this patent is extended or adjusted under 35 U.S.C. 154(b) by 838 days.

(21) Appl. No.: 12/183,939

(22) Filed: Jul. 31, 2008

(65) Prior Publication Data

US 2009/0279798 A1 Nov. 12, 2009

(30) Foreign Application Priority Data

May 12, 2008 (FR) ..................................... 08 53065

(51) Int. Cl.
*G06K 9/36* (2006.01)
(52) U.S. Cl. ....................................................... 382/235
(58) Field of Classification Search ................... 382/233
See application file for complete search history.

(56) References Cited

U.S. PATENT DOCUMENTS

| | | | |
|---|---|---|---|
| 2002/0081033 A1* | 6/2002 | Stentiford | 382/218 |
| 2003/0002734 A1* | 1/2003 | Islam et al. | 382/166 |
| 2003/0108248 A1* | 6/2003 | Huang et al. | 382/240 |
| 2006/0045381 A1* | 3/2006 | Matsuo et al. | 382/276 |
| 2009/0103608 A1* | 4/2009 | Lin et al. | 375/240.2 |

OTHER PUBLICATIONS

Usevitch, B.E.; , "A tutorial on modern lossy wavelet image compression: foundations of JPEG 2000," Signal Processing Magazine, IEEE , vol. 18, No. 5, pp. 22-35, Sep. 2001.*
Martinez-Ponte, I et al., "Robust Human Face Hiding Ensuring Privacy," Proceedings of European Workshop on Image Analysis for Multimedia Interactive Services, Apr. 1, 2005, pp. 1-4.*
Hao-Song Kong; Vetro, A.; Hata, T.; Kuwahara, N.; , "Fast region-of-interest transcoding for JPEG 2000 images," Mitsubishi Electric Research Laboratories, Dec. 2005.*
Martinez-Ponte I et al., Robust Human Face Hiding Ensuring Privacy, Proceedings of European Workshop on Image Analysis for Multimedia Interactive Services, Apr. 1, 2005, pp. 1-4.
Kim Taeyong Cho J. S., Content-Based Video Transcoding in Compressed Domain, Signal Processing Image Communication, Elsevier Science Publishers, Amsterdam, NL, vol. 17, No. 6, Jul. 1, 2002, pp. 497-507.
Hao-Song Kong et al., Fast Region-of-Interest Transcoding for JPEG 2000 Images, IEEE, May 23, 2005, pp. 952-955.

(Continued)

*Primary Examiner* — Bhavesh Mehta
*Assistant Examiner* — Nirav G Patel
(74) *Attorney, Agent, or Firm* — Sterne, Kessler, Goldstein & Fox P.L.L.C.

(57) ABSTRACT

Embodiments of the present invention relate generally to visual degrading of images. Systems and methods for fast visual degrading of an entire image or localized region(s) within the image are provided. In an embodiment, a system for fast localized visual degrading of images includes a map creator and a coefficient list modifier. The map creator generates a map. The map may identify one or more degradation regions within an image. The coefficient list modifier reduces coefficient data in at least one block associated with a degradation region identified in the map. In another embodiment, a computer-implemented method for fast localized visual degrading of images is provided. The method includes generating a map that identifies one or more degradation regions within an image, and reducing coefficient data in at least one block associated with a degradation region identified in the map.

27 Claims, 7 Drawing Sheets

OTHER PUBLICATIONS

Huifang Sun et al., Architectures for MPEG Compressed Bitstream Scaling, IEEE Transactions on Circuits and Systems for Video Technology, IEEE Service Center, Piscataway, NJ, vol. 6, No. 2, Apr. 1, 1996, pp. 191-199.

Eleftheriadis A. et al., Constrained and General Dynamic Rate Shaping of Compressed Digital Video, Proceedings of the International Conference on Image Processing, vol. 3, Oct. 23, 1995, pp. 396-399.

Kenta Chinomi et al., PriSurv: Privacy Protected Video Surveillance System Using Adaptive Visual Abstraction, Advances in Multimedia Modeling, vol. 4903, 2008 (date referred to as Jan. 9, 2007, in PCT search report), pp. 144-154.

Cavallaro A. et al., Semantic Video Analysis for Adaptive Content Delivery and Automatic Description, IEEE Transactions on Circuits and Systems for Video Technology, IEEE Service Center, Piscataway, NJ, vol. 15, No. 10, Oct. 1, 2005, pp. 1200-1209.

PCT, Notification of Transmittal of the International Search Report and the Written Opinion of the International Searching Authority, or the Declaration, International Appln. No. PCT/US2009/002914, European Patent Office, mailed Nov. 4, 2009.

"Information Technology—Digital Compression and Coding of Continuous-tone Still Images—Requirements and Guidelines," The International Telegraph and Telephone Consultative Committee, Sep. 1992, 186 pages.

* cited by examiner

FAST VISUAL DEGRADING OF IMAGES

BACKGROUND OF THE INVENTION

1. Field of the Invention

Embodiments of the present invention relate to image data, and in particular to modification of compressed image data.

2. Background Art

Image data is increasingly made available over computer networks. Image data is often displayed or made available on a variety of web sites, services and applications.

For instance, a map service, photo service, book search service, or other web service or application that provides content may serve image data.

Further, image data may be compressed according to a compression specification or standard to reduce storage requirements and reduce the bandwidth or work required to transmit image data over a network. One example compression (and decompression) technique, referred to as JPEG, compresses original source image data (also called sample data) into compressed image data.

In certain situations it is desirable to blur or even take down compressed image data quickly. This can be especially needed where a service providing content faces a request from a user or other entity to blur or take down an image due to privacy concerns, legal requirements or other needs. For example, a period of time may be needed to determine whether the blur or take down request must be or should be fulfilled, yet. In the meantime, what is needed is for a blur or takedown request to be at least temporarily fulfilled quickly.

However, in the past, it has been difficult to fulfill such requests quickly without slowing or compromising the performance of the content provider service itself or unnecessarily hurting the experience of users. It is especially difficult to fulfill such blur or take down requests in a live, pipelined environment where a content provider hosts or serves a large volume of compressed image data to a large number of users.

BRIEF SUMMARY

Embodiments of the present invention relate generally to visual degrading of images. Systems and methods for fast visual degrading of an entire image or localized region(s) within the image are provided. In an example, an image may be represented by compressed image data that includes one or more blocks. Each block may have a respective list of coefficient data.

In an embodiment, a system for fast localized visual degrading of images is provided. The system includes a map creator and a coefficient list modifier. The map creator generates a map. The map may identify one or more degradation regions within an image. The coefficient list modifier reduces coefficient data in at least one block associated with a degradation region identified in the map.

In another embodiment, a computer-implemented method for fast localized visual degrading of images is provided. The method includes generating a map that identifies one or more degradation regions within an image, and reducing coefficient data in at least one block associated with a degradation region identified in the map.

In a further embodiment, a system for fast degrading of images can degrade an entire image within the image. The system includes a coefficient list modifier that may reduce coefficient data in at least one block and output modified compressed image data having the reduced coefficient data. An image viewed after decompressing the modified compressed image data is visually degraded compared to the image viewed after decompressing the original compressed image data.

In a further embodiment, a method for fast degrading of images can degrade an entire image within the image.

Embodiments of the present invention may be implemented using hardware, firmware, software, or a combination thereof and may be implemented in one or more computer systems or other processing systems.

Further embodiments, features, and advantages of the present invention, as well as the structure and operation of the various embodiments of the present invention, are described in detail below with reference to the accompanying drawings.

BRIEF DESCRIPTION OF THE DRAWINGS

Embodiments of the invention are described with reference to the accompanying drawings. In the drawings, like reference numbers may indicate identical or functionally similar elements.

DETAILED DESCRIPTION OF EMBODIMENTS

Embodiments of the present invention relate generally to visual degrading of images. Systems and methods for fast visual degrading of an entire image or localized region(s) within the image are provided. According to a feature, blur or take down requests of compressed image data may be fulfilled quickly.

The present invention is described with respect to a World Wide Web environment operating on one or networks, such as, the Internet. Such an environment is illustrative and not intended to limit the present invention.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
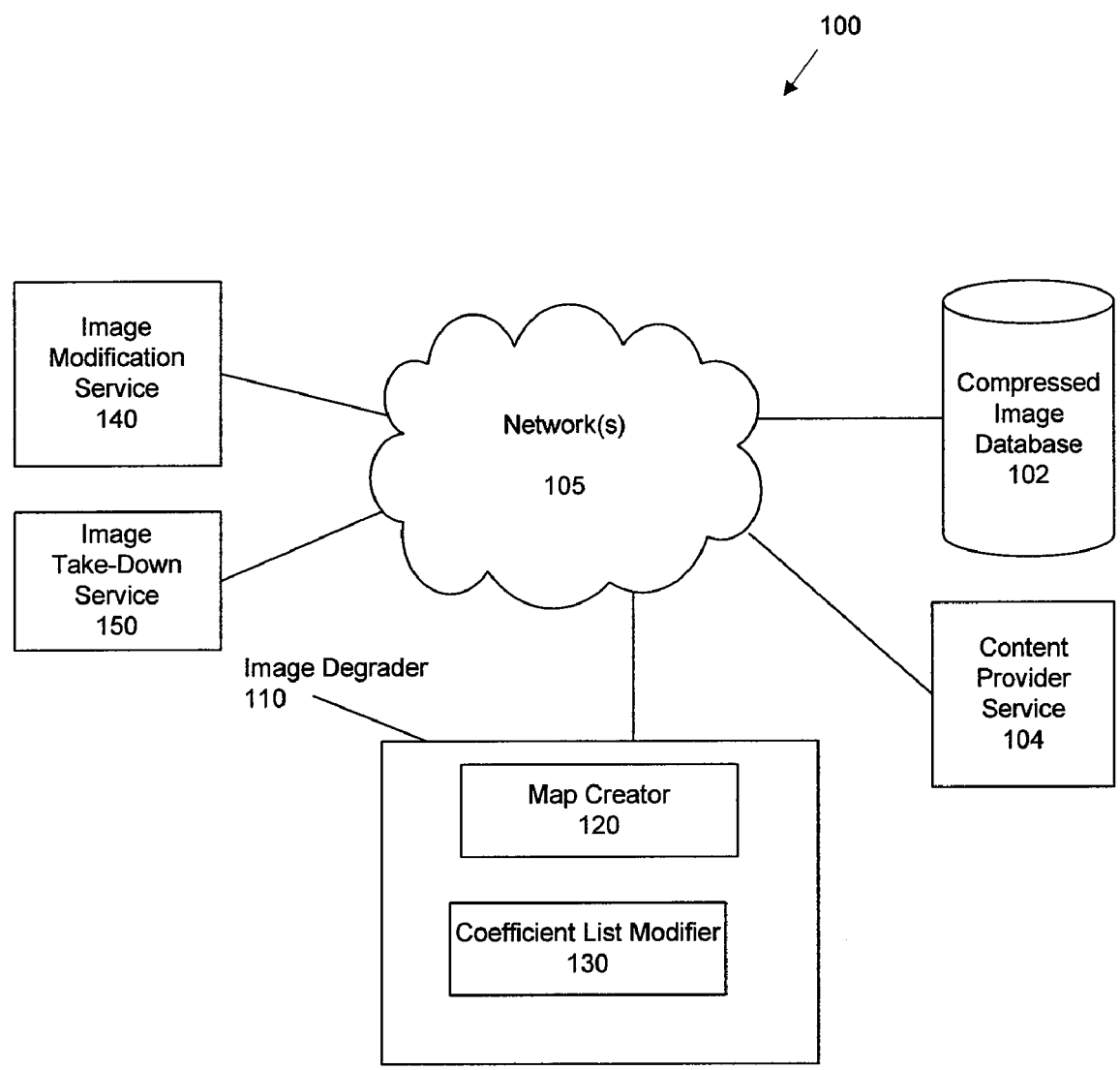
FIG. 1 is a diagram of a system for degrading images within a network environment according to an embodiment of the present invention.

FIG. 1 is a diagram of a system 100 for degrading images within a network environment according to an embodiment of the present invention. System 100 includes an image degrader 110 coupled over one or more networks 105 to a compressed image database 102. According to a feature, image degrader 110 may provide fast visual degrading of images. In embodiments, image degrader 110 can provide visual degrading of an entire image or of one or more localized regions within an image.

Image degrader 110 may include map creator 120 and coefficient list modifier 130. The operation of image degrader 110 including map creator 120 and coefficient list modifier 130 are described further below.

Compressed image database 102 may include compressed image data for a number of images. This compressed image data can include, but is not limited to, data or files having image data compressed according to a (Joint Photographic Experts Group) JPEG specification.

Additional services can also be coupled to network 105. For instance, as shown in FIG. 1, one or more content provider services 104 can be coupled to deliver content over network 105 to remote users. This content can include compressed image data from compressed image database 102 (or other sources not shown). Content provider service 104 can include but not is limited to, a map service (such as, Google Maps service with Street View panorama images available from Google, Inc.), photo service (such as, Picassa photo service available from Google, Inc.), book search service (such as, Google Book service available from Google, Inc.) or other service providing content that includes compressed image data.

System 100 can further include an image modification service 140 and image takedown service 150 coupled to network(s) 105. Image modification service 140 may manage and evaluate requests for modifications of images associated with the compressed image data stored in compressed image database 102. Image modification service 140 may further send requests to image degrader 110 to initiate degradation of images. Such visual degradation of images may be needed, for example, due to privacy concerns, legal requirements, or other reasons. In one example, image modification service 140 may coordinate with content provider service 104 to enable users or administrators to initiate fast visual degradation of images posted or hosted by the content provider service 104. This fast visual degradation can include degradation (including blurring) of selected regions within an image provided by the content provider service 104.

Similarly, image takedown service 150 may initiate requests to image degrader 110 to visually degrade an entire image. Image takedown service 150 may manage and evaluate requests for image takedown. For example, such takedown of images may be needed due to privacy concerns, legal requirements, or other reasons or preferences. In an example, image takedown service 150 may communicate with content provider service 104 to coordinate which images need to be taken down to enable users or administrators to initiate fast visual degradation of images posted or hosted by the content provider service 104. This fast visual degradation can include take down by blurring an entire image provided by the content provider service 104.

In an embodiment, image degrader 110 includes map creator 120 and coefficient list modifier 130. Map creator 120 generates a map. The map identifies one or more degradation regions within an image. The image can be represented by original compressed image data that includes one or more blocks. Each block has a respective list of coefficient data. In one example, the compressed image data including blocks and coefficient data may have been compressed according to a JPEG standard.

Coefficient list modifier 130 reduces coefficient data in at least one block associated with the degradation region identified in the map. In a JPEG example, this reducing of coefficient data can include, but is not limited to, truncating a list of non-zero AC coefficients to a maximum size (bit length) for the respective block. Symbols for one or more AC coefficients may be removed. An end of block (EOB) symbol may also be moved upward or inserted if not already present. Examples of such coefficient data reduction are described in further detail below.

Image modification service 140 and image takedown service 150 are shown separately however this is not intended to be limiting. Image modification service 140 and/or image takedown service 150 can also be incorporated as additional services carried out by the content provider service 104. Image degrader 110 can also be remote and separate (as shown) or alternatively can be local to or part of content provider service 104, image modification service 140, and/or image takedown service 150.

Figure 2:
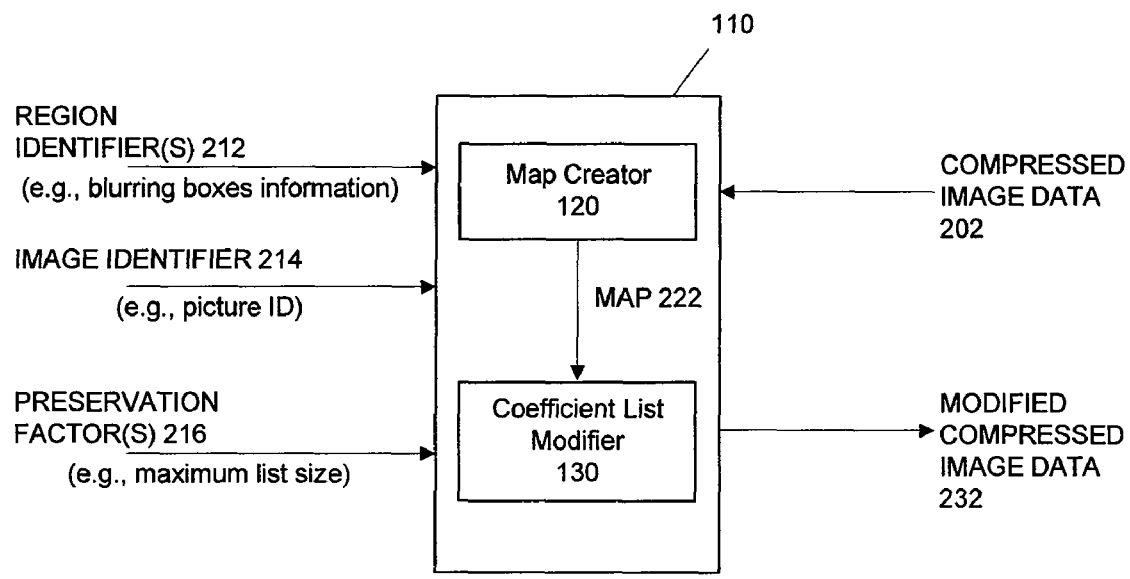
FIG. 2 is a diagram showing an image degrader of FIG. 1 in more detail according to an embodiment of the present invention.

In operation, image degrader 110 may receive a request for fast visual degradation of one or more localized regions within an image. For example, such a request may be sent by an image modification service 140 on behalf of content provider service 104. As shown in FIG. 2, image degrader 110 may further receive, as part of the request, region identifier(s) 212 and an image identifier 214. For example, region identifier 212 may be blurring boxes information that identifies one or more blurring boxes. Each blurring box would correspond to a region to be degraded within the image identified by image identifier 214. The present invention is not intended to be limited to boxes, and in general any shape region (e.g., circles, polygons, or other shape) may be identified for degradation. Image identifier 214 may be an identifier, such as, a picture ID or file name, that enables image degrader 110 to access corresponding compressed image data 202. For example, image degrader 110 may use image identifier 214 to make a request to compressed image database 102 to obtain a file having corresponding compressed image data 202.

Map creator 120 then identifies one or more degradation regions within an image based on the region identifier 212. Map creator 120 then generates a map 222. Map 222 identifies one or more degradation regions within an image. For instance, map 222 may include degradation regions within the image that correspond to the blurring boxes identified in region identifier 212.

Coefficient list modifier 130 receives map 222 and determines which blocks in compressed image data 202 are associated with the one or more identified degradation regions (e.g., determines whether blocks lie within any blurring box identified in region identifier 212). Coefficient list modifier 130 then reduces coefficient data in at least one block associated with a degradation region in map 222. Finally, image degrader 110 outputs a modified compressed image data 232 that includes the reduced coefficient data.

In this way, when the modified compressed image data 232 is viewed or displayed a visual degradation of the image appears in the degradation regions due to the reduced coefficient data. For example, if region identifiers 212 included one or more blurring boxes, then the displayed image would include visual degradation in regions associated with the one or more blurring boxes. In this way, by identifying which regions are to be degraded, a user or administrator can control which regions within the image are visually degraded by image degrader 110.

In one example, compressed image data 202 can include original compressed image data compressed according to a JPEG specification. This can include any JPEG specification including, but not limited to, JPEG compression with Huffman or arithmetic coding of AC coefficients. See, for example, the JPEG specification defined by CCITT ITU, Recommendation T.81, "Information Technology Digital Compression and Coding of Continuous-Tone Still Images—Requirements and Guidelines," (1992 E). As is known with this specification, such JPEG compressed data includes blocks, and each block includes a set of coefficients used in the compressing and decompressing of original samples, or image data. These coefficients include a set of DC and AC coefficients. In one example, a list of AC coefficients has a number of AC coefficients (e.g., up to 63 AC coefficients). The AC coefficients can further be entropy encoded, such as, with Huffman coding or arithmetic coding.

In an embodiment, to reduce coefficient data, coefficient list modifier 130 truncates a list of AC coefficient data in each respective block associated with a degradation region. In one example, coefficient list modifier 130 truncates the list of coefficient data to a maximum size.

In this way, by merely reducing coefficient data, coefficient list modifier 130 can operate and perform fast filtering and output modified compressed image data 232 quickly. Full picture decoding and other expensive or time consuming operations need not be performed. The operation of coefficient list modifier 130 is described further below with respect to method 400.

According to a further feature, preservation factors 216 may also be used. These preservation factors may be predetermined or set by a user or administrator on the fly depending on a particular application. These preservation factors 216 control the level of degradation to be carried out for each block. For example, according to one feature, the preservation factor is used to determine the maximum size in which a coefficient list is truncated by a coefficient list modifier 130. If a relatively low preservation factor is used, meaning little of the image needs to be preserved, then a greater degree of truncation will occur resulting in more degradation of an image. Conversely, if a high preservation factor is used, meaning the image is to be preserved somewhat, then a relatively modest truncation of the coefficient list for a block is performed. In this way, by setting the preservation factor, a user or administrator can control a level of degradation of the visual image.

According to a further feature, different preservation factors can be assigned to different degradation regions within an image to provide controlled degradation in localized regions of an image. For example, map creator 120 may include a preservation factor for each degradation region identified in a map 222. Coefficient list modifier 130 when reading map 222 will reduce coefficient data according to the preservation factor associated with a respective degradation region.

Figure 3C:
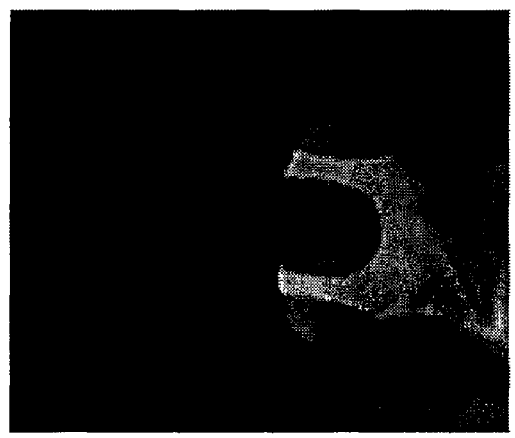
FIGS. 3B and 3C illustrate progressively degraded images of the original image of FIG. 3A according to an embodiment of the present invention.
Figure 3B:
Figure 3A:
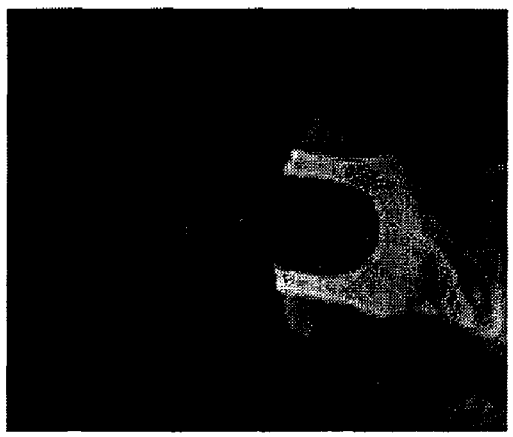
FIG. 3A shows an example original image without degradation.

FIGS. 3A to 3C illustrate different levels of degradation and an image. For example, FIG. 3A shows an original image displayed by decompressing the compressed image data with an unmodified or full set of coefficients for each block. FIG. 3B shows a display of modified compressed image data where a degradation region associated with a face (i.e., a blurring box identified for the face region of the image) has been degraded.

In the example of FIG. 3B, a preservation factor that is relatively high has been used so that modest degrading of the region with a face has occurred but the image at least retains some information regarding a face. FIG. 3C shows an example where the modified compressed image data was generated with a relatively low preservation factor. The degradation of the face in the image is more pronounced (which helps anonymize the face) due to the greater truncation of coefficients in one or more blocks associated with a degradation region (i.e., the face).

System 100 (including each component therein image degrader 110, content provider service 104, services 140 and 150) can be implemented in software, firmware and/or hardware across one or more computing devices. For example, image degrader 110 can be implemented on a computing device. Such a computing device may include but is not limited to a computer, workstation, mobile device or other type of computer. Such a computing device may further include at least one processor and memory.

Figure 4A:
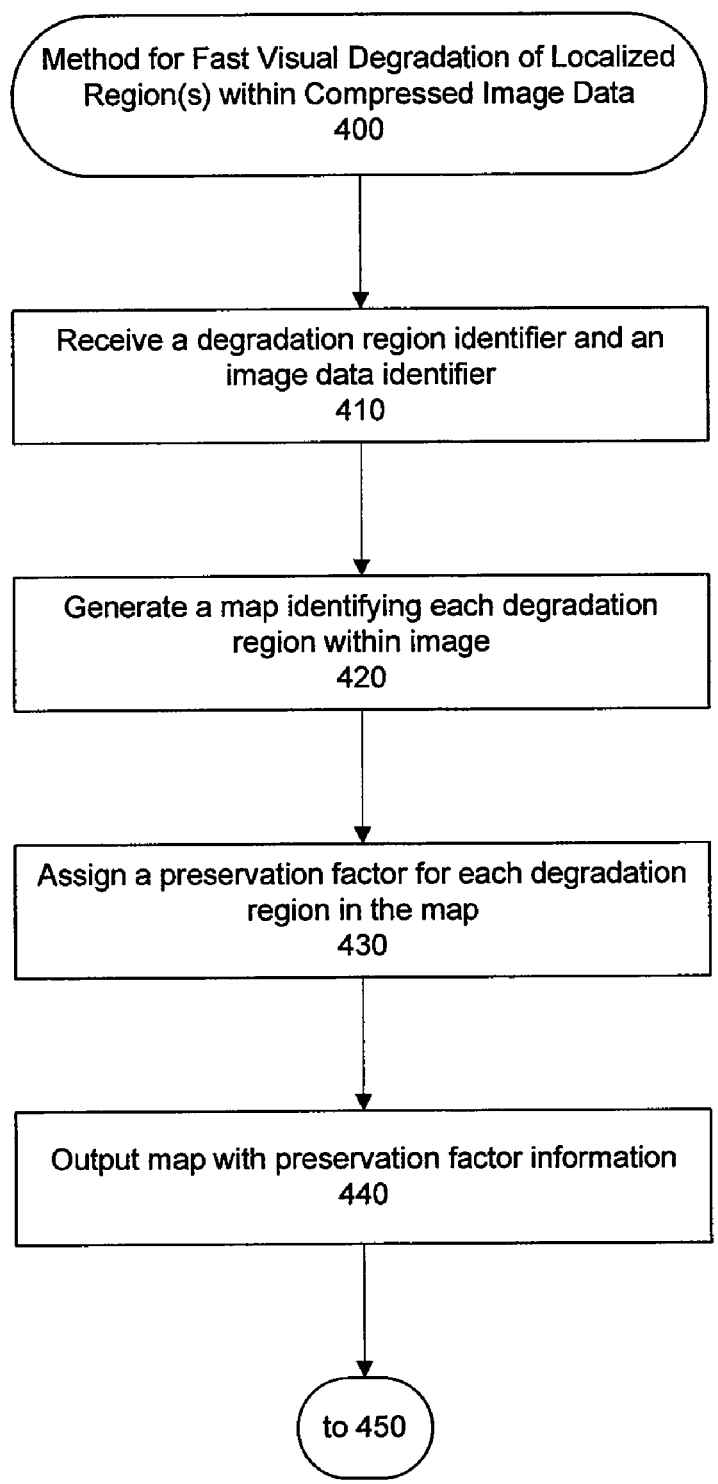
FIGS. 4A and 4B are a flowchart that illustrates a method for degrading images according to an embodiment of the present invention.
Figure 4B:
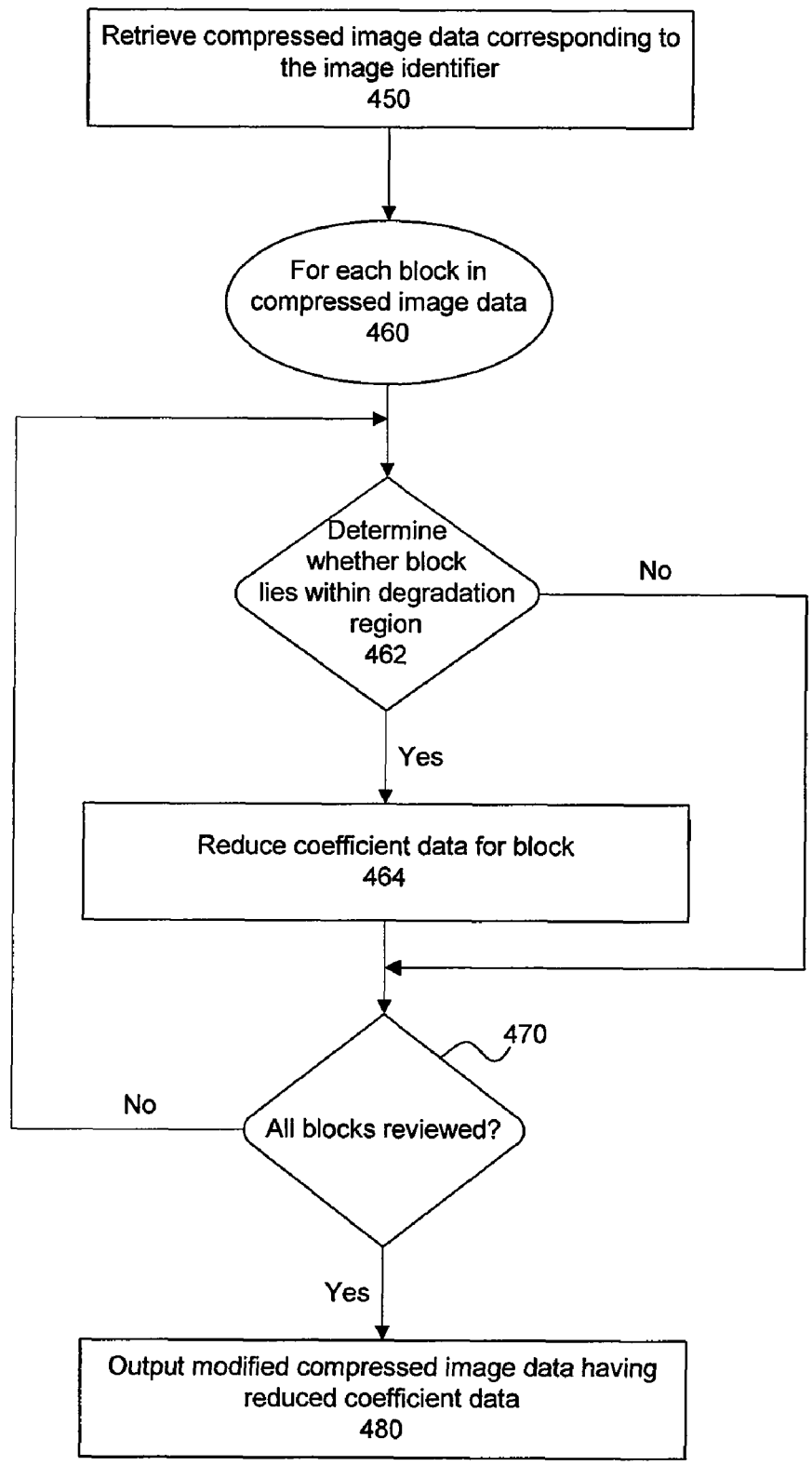

FIGS. 4A and 4B are flowcharts illustrating a method 400 for fast visual degradation of localized regions within compressed image data (steps 410 to 480). For brevity, method 400 may be described with reference to system 100 and in particular to image degrader 110; however, method 400 is not intended to be necessarily limited to this system or image degrader.

As shown in FIG. 4A, in step 410 a degradation region identifier 212 and image identifier 214 are received. In step 420, a map 222 is generated identifying each degradation region within an image identified by image identifier 214. In step 430, a preservation factor is assigned for each degradation region in the map. Finally, in step 440, the map is output with preservation factor information.

As shown in FIG. 4B, in step 450 compressed image data 202 is retrieved that corresponds to the received image identifier 214. A routine 460 is then carried out for each block in the compressed image data 202. First, a determination is made on whether a block lies within a degradation region (step 462). If not, then control proceeds to step 470. If the block does lie within a degradation region, then control proceeds to step 464. In step 464, coefficient data is reduced for the block.

Control then proceeds to step 470. In step 470, a check is made on whether all blocks have been reviewed. If all blocks have not been reviewed, then control proceeds to step 462. Otherwise, control proceeds to step 480. In step 480, modified compressed image data 232 is output having the reduced coefficient data. In an example, steps 410-440 may be carried out by map creator 120, and steps 450-480 may be carried out by coefficient list modifier 130.

Figure 5:
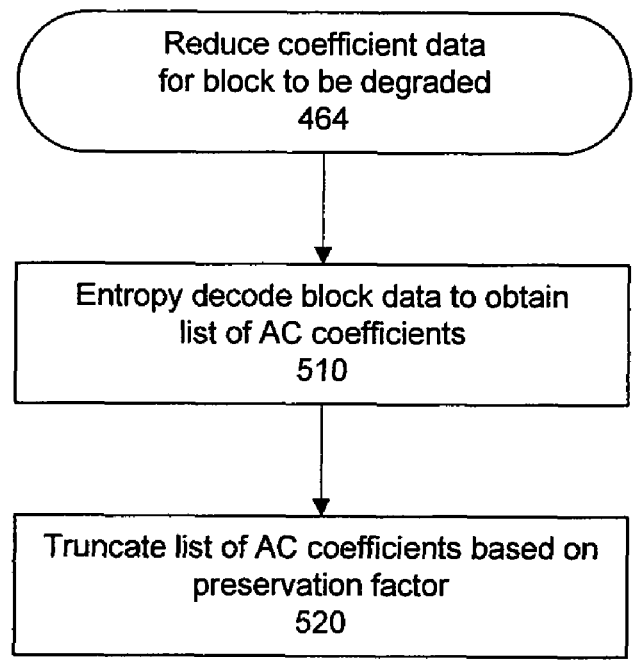
FIG. 5 is a flowchart that illustrates a step of reducing coefficient data for a block in further detail according to an embodiment of the present invention.

FIG. 5 shows steps for reducing coefficient data for a block in step 464 in greater detail (steps 510-520) according to an embodiment of the present invention. In particular, this coefficient data reduction is described for an example where compressed image data 202 comprises image data previously compressed according to a JPEG specification with blocks having Huffman coding of AC coefficients. This example JPEG specification with entropy encoding is illustrative and not intended to limit the present invention.

In step 510 block data is entropy decoded to obtain the original list of AC coefficients for the block. In step 520, the list of AC coefficients is then truncated based on a preservation factor. It is helpful to consider these steps in more detail with reference to a particular type of compressed image data.

Consider the JPEG example where compressed image data 202 was previously compressed with Huffman coding according to a JPEG compression specification. In this case, block data with a list of AC coefficients may have been entropy encoded during compression using Huffman coding according to the JPEG standard. In this example, the block data is then entropy decoded to obtain the list of AC coefficients (step 510). Such entropy decoding is known in the art would be apparent to a person skilled in the art given this description. For instance, entropy decoding in step 510 may be carried out on bits of a block in order to infer syntax and boundaries of coefficients. An end of block or (EOB) marker may be found. In one example, all non-zero AC coefficients may be sequentially decoded to find their bit boundary and location of each block's EOB marker.

In step 520 for this JPEG example, the entropy decoded list of the AC coefficients may be truncated based on a preservation factor. For instance, an EOB marker may be identified (or added) and moved upward in a file. Superfluous bit-segments or symbols may be removed. If a preservation factor is used, truncation may be made up to a maximum size set by the preservation factor. Modified compressed image data 232 is then output. No entropy recoding is needed since an AC coefficient value is not modified.

In one example, consider notation of paragraph F.2.2.2. in the ITU, Recommendation T.81 JPEG specification. For instance, each code is noted [0xRS] in hexadecimal. R and S are in range [0 . . . 15]. The actual bits of the VLC codes are not shown, but only the symbol. The mapping between VLC Huffman codes (bits sequence) and the 0xRS or ZZ(K) symbols are unmodified need not be described further here.

Symbol [0xf0] is noted "EOB" (End Of Block) and should be preserved (or inserted if it was originally missing from the block. A missing EOB marker can occur if the block fully contains all of the possible AC coefficients (i.e., all 63 AC coefficients). DC is the first coefficient, left untouched.

Here are original symbols in an example compressed JPEG image file:

```
Input:
---><------------ block N ---------> <--------- block N+1 ---------->
....[DC][0x30]ZZ(4)[0x40]ZZ(9)[0xf0] [DC][0x20]ZZ(3)[0x40]ZZ(8)
[0xf0]
```

Each block consists of a DC coefficient, kept unmodified, followed by some pairs of [0x?0]ZZ(K) symbols for the AC coefficients, and terminated by an 0xf0 "EOB" symbol, if there is less than 63 AC coefficients.

If one wants to degrade block N only, one can remove certain bits corresponding to the [0x?0]ZZ(K) symbol pairs, and preserve (or re-introduce) the terminal EOB symbol.

So, degrading block N (by keeping 1 coefficient) if it belongs to a face, and preserving block N+1, will give the following shorter JPEG:

```
Output:
---><----- block N -----> <--------- block N+1 ----------> <---.
....[DC][0x30]ZZ(4)[0xf0] [DC][0x20]ZZ(3)[0x40]ZZ(8)[0xf0] ....
```

Image Degrader with Degradation of an Entire Image Only

Figure 6:
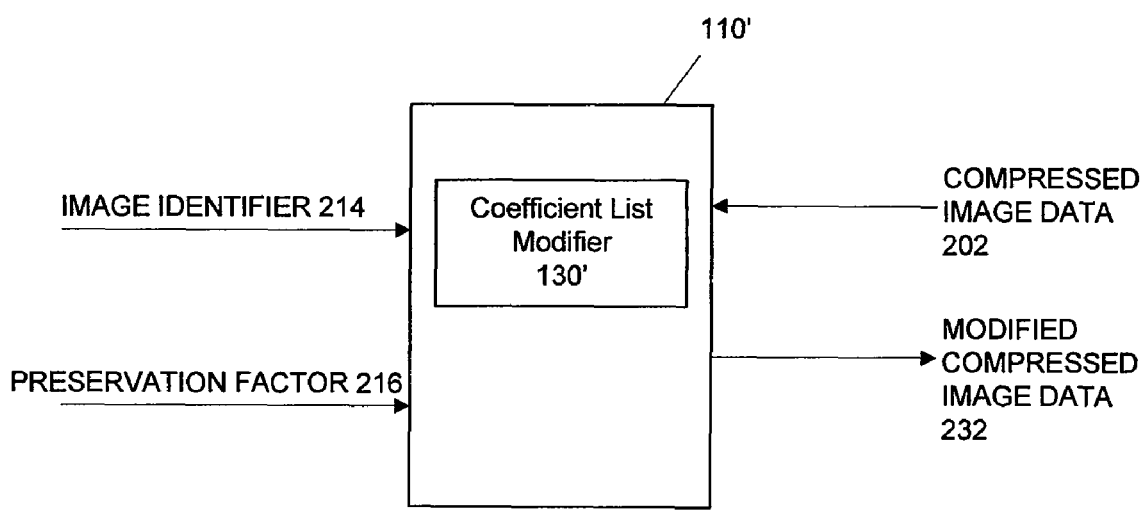
FIG. 6 is a diagram showing an image degrader according to a further embodiment of the present invention.

FIG. 6 shows an image degrader according to a further embodiment, an image degrader 110' according to a further embodiment of the present invention. As shown in FIG. 6, image degrader 110' may omit map creator 120 and only include a coefficient list modifier 130'. In this embodiment, image degrader 110' may be used to degrade an entire image. For example, such degradation of an entire image may be used when a user or administrator wants an entire image to be taken down quickly or blurred quickly over a network.

Image degrader 110' otherwise operates as described above with respect to image degrader 110. Similarly, coefficient list modifier 130' operates as described above with respect to coefficient list modifier 130 except coefficient list modifier 130' reduces coefficient data for all blocks associated with an image. Alternatively, a similar result may achieved with coefficient list modifier 130 may having map creator 120 generate a map with a low preservation factor across all regions of an image to blur an entire image.

Further Features and Advantages

In one feature, system 100 and method 400 can provide low-cost on-line filtering of JPEG compressed image files to provide progressive and highly localized degradation of pictures. Embodiments may be applied among other things to face-blurring privacy enhancement, with emphasis on high-performance and low-utilization of computing resources for serving purpose. Fast take-down and real-time face-blurring requests can be accommodated.

According to a feature, a JPEG file may be modified using a process that produces a valid JPEG file as output, but contains visually degraded regions (e.g., boxes) and requires relatively little computing power. In particular, no decompression and reconstruction may be involved. Only some syntactic elements are discarded to achieve a goal of blurring a region on a JPEG picture (such as, a face, license plate or other region of interest). Moreover, several iterations of a degradation alteration can be performed as a particular case is resolved without the need for a costly update of a JPEG file itself.

In an example, a JPEG syntax may be used to modify the number of Fourier-transformed coefficients stored on some particular user-specified blocks (also called macroblocks). Visual degradation of one such macroblock is achieved by truncating the number of coded coefficients so that it does not exceed a given number supplied parametrically.

No additional syntax injection is required since one need only remove information from the original JPEG file. The list of AC coefficients may be truncated to match a given maximal size, and the end of the list may be forced by inserting a terminating symbol referred to as EOB in the JPEG specification.

The present invention is not limited to reducing coefficient data in compressed image data. In a still further embodiment, an image degrader (system or method) may be used which truncates bits in compressed image data associated with one or more regions to be visually degraded. These truncated bits may or may not include coefficient data depending upon the compression or file format used.

In an embodiment, a method for fast degrading of image, each image being represented by original compressed image data, may include steps of truncating bits in the compressed image data associated with one or more regions; and outputting modified compressed image data having the truncated bits, whereby, an image viewed after decompressing the modified compressed image data is visually degraded compared to the image viewed after decompressing the corresponding original compressed image data. In another embodiment, a system for fast degrading of images, each image being represented by original compressed image data, may include an image degrader that truncates bits in the compressed image data associated with one or more regions, and outputs modified compressed image data having the truncated bits, whereby, an image viewed after decompressing the modified compressed image data is visually degraded compared to the image viewed after decompressing the corresponding original compressed image data.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While various embodiments of the present invention have been described above, it should be understood that they have been presented by way of example, and not limitation. It will be apparent to persons skilled in the relevant art(s) that various changes can be made therein without departing from the scope of the invention.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A system for fast localized visual degrading of images at a server, comprising:
    a map creator configured to receive, from a content provider service, a network request to visually degrade one or more regions within an image, the image being represented by original compressed image data that includes one or more blocks, each block having a respective list of coefficient data, wherein the network request includes at least an image identifier that indicates the original compressed image data to be retrieved from a database, the original compressed image data including entropy encoded coefficient data and further configured to generate a map, wherein the map identifies the one or more degradation regions within the entropy encoded coefficient data of the image; and
    a coefficient list modifier that truncates at least an ordered portion of the coefficient data for each block associated with a degradation region identified in the map, wherein a terminating symbol is either preserved or inserted at the end of each block and the truncated portion is removed from each block and further wherein each block is truncated starting at the end of the list of coefficient data.

2. The system of claim 1, wherein the coefficient list modifier determines which blocks are associated with the one or more degradation regions identified in the map and reduces the coefficient data in the respective list of each determined degradation region block.

3. The system of claim 1, wherein the coefficient list modifier truncates the list of coefficient data in each respective block associated with a degradation region to a maximum size.

4. The system of claim 1, wherein the coefficient list modifier truncates the list of coefficient data in each respective block associated with a degradation region to a maximum size defined by a respective preservation factor.

5. The system of claim 1, wherein the map further includes a preservation factor for each respective degradation region identified in the map.

6. The system of claim 5, wherein the coefficient list modifier truncates the list of coefficient data in each respective block associated with a degradation region to a maximum size defined by the preservation factor for the degradation region.

7. The system of claim 1, wherein the coefficient list modifier entropy decodes the entropy encoded coefficient data and then reduces the coefficient data in each block associated with a degradation region identified in the map.

8. The system of claim 7, wherein the coefficient list modifier further entropy encodes the reduced coefficient data and outputs modified compressed image data having the entropy encoded reduced coefficient data.

9. The system of claim 1, wherein the original compressed image data comprises image data compressed according to a JPEG standard.

10. The system of claim 1, wherein the coefficient data includes alternating current (AC) coefficients defined according to a JPEG standard, and the coefficient list modifier truncates the AC coefficients for the at least one block associated with a degradation region identified in the map.

11. A computer-implemented method for fast localized visual degrading of images at a server, comprising:
    receiving a network request, from a content provider service, to visually degrade one or more degradation regions within an image, wherein the network request includes at least an image identifier that indicates original compressed image data to be retrieved from a database, the original compressed image data including entropy encoded coefficient data;
    generating a map, that identifies the one or more degradation regions within the entropy encoded coefficient data of the image, the image being represented by the original compressed image data that includes one or more blocks, each block having a respective list of coefficient data; and
    truncating at least a portion of the coefficient data in each block associated with a degradation region identified in the map, wherein a terminating symbol is either preserved or inserted at the end of each block and the truncated portion is removed from each block and further wherein each block is truncated starting at the end of the list of coefficient data.

12. The method of claim 11, further comprising determining which blocks are associated with the one or more degradation regions identified in the map prior to the coefficient data reducing step.

13. The method of claim 11, wherein the reducing comprises truncating the list of coefficient data in each respective block associated with a degradation region to a maximum size.

14. The method of claim 11, the reducing comprises truncating the list of coefficient data in each respective block associated with a degradation region to a maximum size defined by a respective preservation factor.

15. The method of claim 11, further comprising enabling a user to set a preservation factor for each respective degradation region identified in the map.

16. The method of claim 11, further comprising entropy decoding the entropy encoded coefficient data to obtain the coefficient data in each block associated with a degradation region identified in the map.

17. The method of claim 16, further comprising:
    outputting modified compressed image data having the truncated coefficient data.

18. The method of claim 11, wherein the original compressed image data comprises image data compressed according to a JPEG standard.

19. The method of claim 11, wherein the coefficient data includes alternating current (AC) coefficients defined according to a JPEG standard, and the reducing comprises truncating the AC coefficients for the at least one block associated with a degradation region identified in the map.

20. A system for fast degrading of images, each image being represented by original compressed image data that includes one or more blocks, each block having a respective list of entropy encoded coefficient data and the system comprising:
a coefficient list modifier configured to process a network request from a content provider service to visually degrade one or more regions within an image and truncate least a portion of the entropy encoded coefficient data in at least one selected block and output modified compressed image data having the truncated coefficient data, wherein a terminating symbol is either preserved or inserted at the end of the selected block and further wherein the selected block is truncated starting at the end of the list of coefficient data and whereby, an image viewed after decompressing the modified compressed image data is visually degraded compared to the image viewed after decompressing the original compressed image data.

21. The system of claim 20, wherein the coefficient list modifier truncates coefficient data in selected blocks associated with at least one degradation region, whereby, the image may be displayed with fast visual degradation of at least one localized region within the image.

22. The system of claim 20, wherein the coefficient list modifier reduces coefficient data in all blocks, whereby, the image may be displayed with fast visual degradation of the entire image.

23. A method for fast degrading of images, each image being represented by original compressed image data that includes one or more blocks, each block having a respective list of entropy encoded coefficient data, the method comprising:
receiving, at a server, a network request, from a content provider service, to degrade an image, wherein the network request includes at least an image identifier that indicates the original compressed image data to be retrieved from a database;
reducing the entropy encoded coefficient data in each block, wherein a terminating symbol is either preserved or inserted at the end of each block and further wherein each block is truncated starting at the end of the list of coefficient data; and
outputting modified compressed image data having the reduced coefficient data, whereby, an image viewed after decompressing the modified compressed image data is visually degraded compared to the image viewed after decompressing the corresponding original compressed image data.

24. The method of claim 23, the request includes at least region identifier and an image identifier, wherein the image identifier identifies the original compressed image data, and the region identifier identifies at least one degradation region within the image.

25. The method of claim 23, wherein the receiving includes receiving a preservation factor that identifies a maximum size, and wherein the reducing comprises truncating coefficient data in at least one block to not exceed the maximum size.

26. A method for fast degrading of images, each image being represented by original compressed image data, the method comprising:
truncating bits in the compressed image data associated with one or more regions, wherein a terminating symbol is either preserved or inserted at the end of a selected block and further wherein the selected block is truncated starting at the end of the list of coefficient data; and
outputting modified compressed image data having the truncated bits, whereby, an image viewed after decompressing the modified compressed image data is visually degraded compared to the image viewed after decompressing the corresponding original compressed image data.

27. A system for fast degrading of images, each image being represented by original compressed image data, comprising:
an image degrader that truncates bits in the compressed image data associated with one or more regions, wherein a terminating symbol is either preserved or inserted at the end of a selected block and each block is truncated starting at the end of the list of coefficient data and outputs modified compressed image data having the truncated bits, whereby, an image viewed after decompressing the modified compressed image data is visually degraded compared to the image viewed after decompressing the corresponding original compressed image data.

* * * * *